United States Patent Office.

HEINRICH AUGUST BERNTHSEN, OF MANNHEIM, GERMANY, AND GEORGE F. JAUBERT, OF PARIS, FRANCE, ASSIGNORS TO THE BADISCHE ANILIN AND SODA FABRIK, OF LUDWIGSHAFEN, GERMANY.

BLUE DYE AND PROCESS OF MAKING SAME.

SPECIFICATION forming part of Letters Patent No. 617,628, dated January 10, 1899.

Application filed December 27, 1897. Serial No. 663,732. (Specimens.)

*To all whom it may concern:*

Be it known that we, HEINRICH AUGUST BERNTHSEN, a subject of the King of Prussia, Emperor of Germany, residing at Mannheim, Germany, and GEORGE F. JAUBERT, a citizen of the Swiss Republic, residing at Paris, France, both doctors of philosophy, have invented new and useful Improvements in the Process for Production of Blue Mordant-Dyeing Coloring-Matters, of which the following is a specification.

The present invention is based on the fact that the oxynaphthindophenolthiosulfonic acid or its salts, which we hereinafter designate by the collective term "oxynaphthindophenolthiosulfonic" substance, such as can be obtained by oxidation of an equimolecular mixture of a paradiaminthiosulfonic acid and 1.2.6-amidonaphtholsulfo-acid and which form the subject of another application for Letters Patent, Serial No. 662,179, filed by us December 27, 1897, can by treatment with concentrated mineral acids be converted into very valuable blue dyestuffs, which on chrome-mordanted cotton or wool yield blue shades of great brilliancy and of high fastness against light and washing. This conversion is preferably performed by concentrated sulfuric acid in which the oxynaphthindophenolthiosulfonic acids are dissolved. The obtained yellow solution then is warmed on the water-bath or left standing for a longer time till its color has turned into a clear green; also, other mineral acids, such as concentrated hydrochloric acid, can be similarly used.

The following is an example of the way practical results can be obtained; but we consider it as merely typical, since it allows a considerable variation without altering the desired result.

Dissolve about ten (10) parts of the oxynaphthindophenolthiosulfonic substance in about fifty to one hundred (50 to 100) parts of ordinary concentrated sulfuric acid and heat the solution on the water-bath for about half an hour or until the color of the solution has turned into green and a test poured into water and filtered does no more give a yellowish, but a practically colorless filtrate. Allow to cool, pour onto ice or into cold water, and collect the coloring-matter by filtering. It is washed and can be either applied in the form of a paste, or preferably, after conversion into sodium salt, it can be dried and reduced to powder.

The dyestuff thus prepared is soluble in water with a blue and in concentrated sulfuric or hydrochloric acid with a green color. It dyes wool or cotton mordanted with a chromium mordant with blue shades of extraordinary fastness to light and washing.

Now what we claim is—

The process of manufacturing a blue mordant-dyeing dyestuff which consists in treating an oxynaphthindophenolthiosulfonic substance with a concentrated mineral acid substantially as described.

In testimony whereof we have hereunto set our hands in the presence of two subscribing witnesses.

HEINRICH AUGUST BERNTHSEN.
GEORGE F. JAUBERT.

Witnesses for Heinrich August Bernthsen:
GUSTAV L. LICHTENBERGER,
PAUL JULIUS.

Witnesses for George F. Jaubert:
EDWARD P. MACLEAN,
JOHN S. ABERCROMBIE.